(12) United States Patent
Kitahara

(10) Patent No.: US 9,028,075 B2
(45) Date of Patent: *May 12, 2015

(54) PROJECTOR FOR PREVENTING THERMAL DETERIORATION OF A LIGHT SHIELDING MEMBER

(71) Applicant: Seiko Epson Corporation, Tokyo (JP)

(72) Inventor: Wataru Kitahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/220,638

(22) Filed: Mar. 20, 2014

(65) Prior Publication Data
US 2014/0204350 A1   Jul. 24, 2014

Related U.S. Application Data

(63) Continuation of application No. 12/719,224, filed on Mar. 8, 2010, now Pat. No. 8,714,753.

(30) Foreign Application Priority Data

Mar. 11, 2009   (JP) ................................. 2009-058087

(51) Int. Cl.
*G03B 21/14* (2006.01)
*G03B 9/14* (2006.01)
*G03B 21/20* (2006.01)

(52) U.S. Cl.
CPC ............... *G03B 21/142* (2013.01); *G03B 9/14* (2013.01); *G03B 21/2053* (2013.01); *G03B 21/2013* (2013.01); *G03B 21/2026* (2013.01)

(58) Field of Classification Search
CPC ........ G03B 21/2053; G03B 9/04; G03B 9/07; G03B 9/08; G03B 9/36
USPC ................................................. 353/88, 93, 97
See application file for complete search history.

(56) References Cited

U.S. PATENT DOCUMENTS

| 5,053,934 | A | 10/1991 | Krebs |
| 2006/0050248 | A1 | 3/2006 | Koga et al. |
| 2009/0244496 | A1* | 10/2009 | Sugino et al. .................. 353/85 |

FOREIGN PATENT DOCUMENTS

JP   A-2001-174910   6/2001

* cited by examiner

*Primary Examiner* — Sultan Chowdhury
*Assistant Examiner* — Danell L Owens
(74) *Attorney, Agent, or Firm* — Oliff PLC

(57) ABSTRACT

A projector includes: a light source device; an optical modulation device configured to modulate a luminous flux emitted from the light source device in accordance with image information, forming an image; a projection optical device configured to project the image; a shutter device including a light shielding plate which can move into and out of an optical path of the luminous flux ranging from the light source device to the optical modulation device, shields the luminous flux by the light shielding plate moving into the optical path; and a light control device which being disposed on the optical path's upstream side of the shutter device, changes the area of a light passage through which the luminous flux passes, controlling the quantity of the luminous flux.

4 Claims, 8 Drawing Sheets

PROJECTOR FOR PREVENTING THERMAL DETERIORATION OF A LIGHT SHIELDING MEMBER

This application is a Continuation Application of U.S. patent application Ser. No. 12/719,224 filed on Mar. 8, 2010 which claims priority to Japanese Patent Application No. 2009-058087 filed on Mar. 11, 2009.

BACKGROUND

1. Technical Field

The present invention relates to a projector.

2. Related Art

In a projector, heretofore, a configuration has been known wherein, by using a light shielding plate, a projection image displayed on a screen, or the like, is temporarily put into nondisplay (hereafter described as image mute) (for example, refer to JP-A-2001-174910).

In a projector described in JP-A-2001-174910, a movable light shielding plate is provided in one place inside the optical path of a luminous flux emitted from a light source device, and by causing the light shielding plate to operate, the luminous flux emitted from the light source device is shielded by the light shielding plate, setting the image mute.

With the projector described in JP-A-2001-174910, as the image mute is set using the light shielding plate provided in the one place inside the optical path, the result being that approximately the whole of the luminous flux emitted from the light source device is made incident on the light shielding plate, the light shielding plate is likely to be raised to a high temperature.

In particular, as an increase in luminance of the light source device has been promoted in recent years, there is a problem in that a rise in temperature of the light shielding plate becomes noticeable, and the light shielding plate thermally deteriorates.

SUMMARY

An advantage of some aspects of the invention is to provide a projector with which it is possible to prevent a thermal deterioration of a light shielding plate used at a time of image mute.

A projector according to one aspect of the invention includes a light source device; an optical modulation device which modulates a luminous flux emitted from the light source device in accordance with image information, forming an image; a projection optical device configured to project the image; a shutter device including a light shielding plate which can move into and out of an optical path of the luminous flux ranging from the light source device to the optical modulation device, shields the luminous flux by the light shielding plate moving into the optical path; and a light control device which being disposed on the optical path's upstream side of the shutter device, changes the area of a light passage through which the luminous flux passes, controlling the quantity of the luminous flux.

According to the aspect of the invention, the projector includes, apart from the shutter device having the light shielding plate, the light control device disposed on the optical path's upstream side of the shutter device. By this means, when the image mute is set by the light shielding plate being moved into the optical path, one portion of the luminous flux emitted from the light source device can be shielded by the light control device too. That is, at the time of image mute, the luminous flux emitted from the light source device is shielded by one portion of the luminous flux being made incident on the light control device, and furthermore, the remaining luminous flux being made incident on the light shielding plate.

Consequently, as the quantity of the luminous flux made incident on the light shielding plate is, at the time of image mute, reduced by the quantity of the luminous flux shielded by the light control device, it is possible to suppress a rise in temperature of the light shielding plate, and it is possible to prevent a thermal deterioration of the light shielding plate.

Also, as the shutter device and light control device shield the luminous flux ranging from the light source device to the optical modulation device at the time of image mute, it does not happen that the luminous flux is made incident on optical elements, such as the optical modulation device, disposed on the optical path's downstream side of the shutter device. That is, it is also possible to prevent optical elements, such as the optical modulation device, from thermally deteriorating due to unnecessary light being made incident on the optical elements.

As it is possible, according to the above, to prevent the thermal deterioration of the light shielding plate and optical elements, it is possible to achieve an increase in lifespan of the projector.

With the projector according to the aspect of the invention, it is preferable to further include a control unit which controls an operation of the light control device in accordance with the movement of the light shielding plate, wherein the control unit controls the operation of the light control device in such a way as to shield one portion of the luminous flux emitted from the light source device when the light shielding plate moves into the optical path.

According to the aspect of the invention, as the projector includes the heretofore described control unit, it is possible, at the time of image mute, to cause the light control device to operate automatically in such a way as to shield one portion of the luminous flux emitted from the light source device. Because of this, it is possible, at the time of image mute, to reliably reduce the quantity of the luminous flux made incident on the light shielding plate.

Also, by employing the heretofore described control by the control unit of the operation of the light control device, it is possible, at the time of image mute, to cause the light control device to operate in such a way that the area of the light passage becomes an appropriate area, and it is also possible to prevent the light control device from being raised to an excessively high temperature. That is, it is possible to suppress the rise in temperature of the light control device and light shielding plate in a balanced manner.

With the projector according to the aspect of the invention, it is preferable that the light control device includes a plurality of light shielding blades which being formed in a plate-like shape extending perpendicular to the optical axis of the luminous flux, move parallel to their plate surfaces, changing the area of the light passage.

According to the aspect of the invention, the light control device, including the plurality of plate-like light shielding blades extending perpendicular to the optical axis, changes the area of the light passage by moving the plurality of light shielding blades parallel to their plate surfaces. By this means, as it is possible to configure the plurality of light shielding blades of a simple plate body, it is possible to manufacture the plurality of light shielding blades easily.

With the projector according to the aspect of the invention, it is preferable that the light control device includes a pair of the light shielding blades opposed to each other across the optical axis, and a pair of moving members which, being connected one to each of the pair of light shielding blades, and disposed side by side in a direction parallel to the optical axis, move together with the pair of light shielding blades, and that racks are formed in a direction of the movement, one at each of the mutually opposed edges of the pair of moving members.

Herein, it is acceptable to form the light shielding blades and moving members integrally, or it is also acceptable to adopt a configuration wherein the light shielding blades and moving members configured of separate members are integrated.

According to the aspect of the invention, the light control device includes the heretofore described pair of moving members, apart from the pair of light shielding blades. By this means, in the event that the rotating gear rotating in conjunction with the drive of the motor is disposed between the pair of moving members, and meshed with the rack of each moving member, by the motor being driven, the rotation of the rotating gear is transmitted to the pair of moving members, enabling the pair of light shielding blades to move close to and away from each other (enabling area of the light passage between the pair of light shielding blades to be changed). Because of this, it is possible to simplify the structure of the light control device.

Also, the pair of moving members, being connected one to each of the pair of light shielding blades, are disposed side by side in the direction parallel to the optical axis. That is, the moving members are formed in such a way that each of them is connected to one light shielding blade, and extends toward the other light shielding blade. By this means, it is possible to make a moving structure, such as the pair of moving members, which moves the pair of light shielding blades, a simple and small structure without increasing its size in a direction away from the optical axis.

With the projector according to the aspect of the invention, it is preferable that the light shielding blades and moving members are configured of separate members.

However, the light shielding blades, in order to prevent the thermal deterioration thereof due to the luminous flux being made incident thereon, are formed of a material such as a metal with a high heat resistance.

Then, when the light shielding blades and moving members are integrally formed of a metal material, a friction sound due to the meshing of the racks of the moving members with the heretofore described rotating gear, and a friction sound due to a sliding contact of the pair of moving members with a member supporting each moving member, are likely to occur when the light control device operates.

According to the aspect of the invention, as the light shielding blades and moving members are configured of separate members, for example, the light shielding blades can be formed of a metal material, while the moving members can be formed of a resin material. Because of this, it is possible, when the light control device operates, to reduce the friction sound due to the meshing of the racks with the heretofore described rotating gear, and the friction sound due to the sliding contact of the pair of moving members with the members supporting the pair of moving members. Consequently, it is possible to secure a silence of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, a description will be given, based on the drawings, of one embodiment of the invention.

Configuration of Projector

Figure 1:
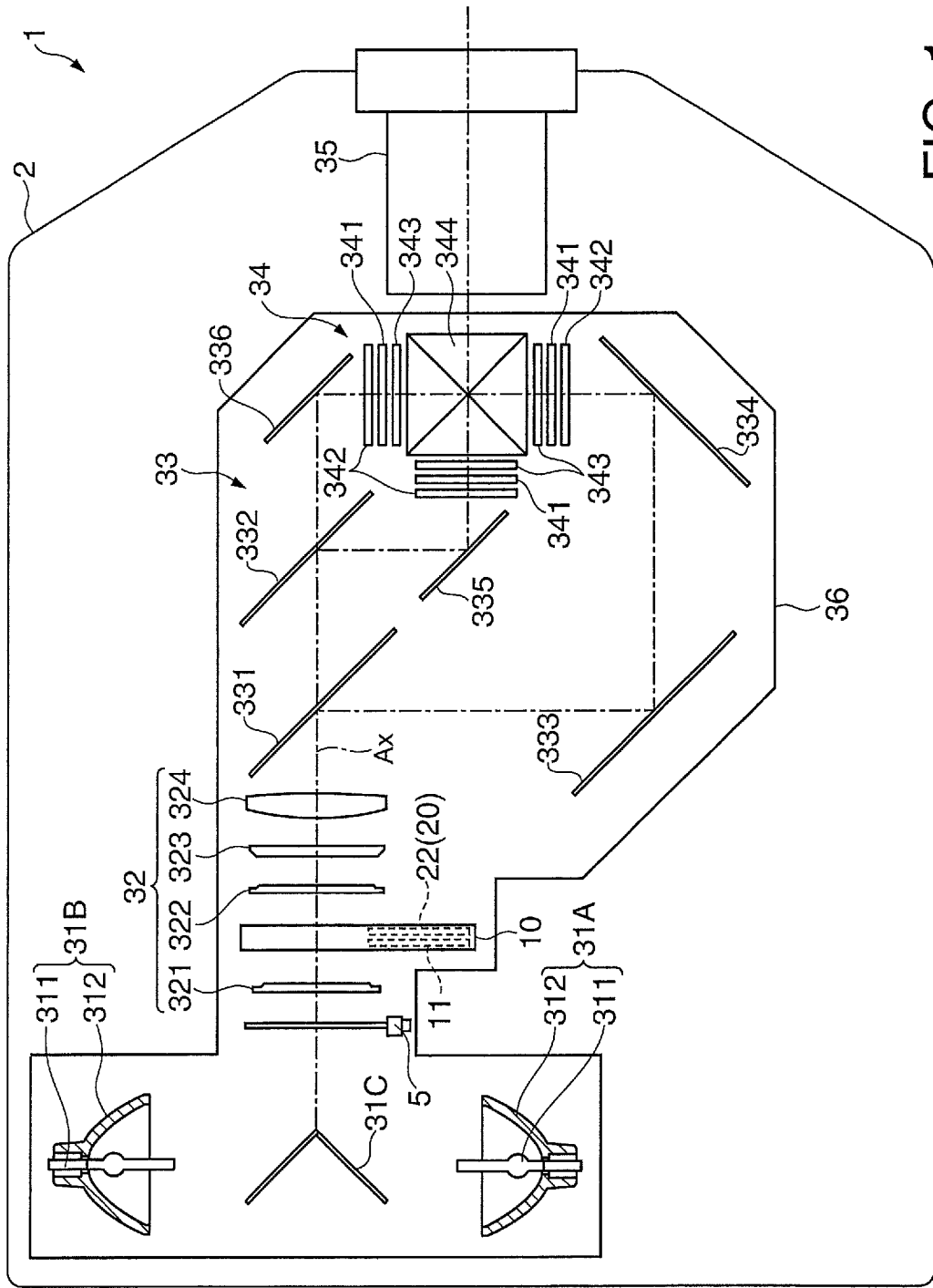
FIG. 1 is a diagram showing an outline configuration of a projector in an embodiment.

FIG. 1 is a diagram showing an outline configuration of a projector 1 of the embodiment.

Hereafter, for convenience of description, a side on which a projection lens 35 (FIG. 1) is disposed is taken to be a "front", and the opposite side to be a "back". Also, a "left" and "right", to be described hereafter, respectively mean the "left" and "right" as seen from the back side.

The projector 1 forms an image according to image information, and projects it onto a screen (not shown). As shown in FIG. 1, the projector 1 has a configuration such that an optical unit 3 and a control unit 4 (refer to FIG. 7) are housed inside an exterior housing 2.

Configuration of Optical Unit

The optical unit 3, under a control by the control unit 4, forms the image in accordance with the image information, and projects it.

As shown in FIG. 1, the optical unit 3 includes a pair of light source devices 31A and 31B, a reflecting mirror 31C, an illumination optical device 32 having a first lens array 321, a second lens array 322, a polarization conversion element 323, and a superimposing lens 324, a color separation optical device 33 having dichroic mirrors 331 and 332, and reflecting mirrors 333 to 336, an optical device 34 having three liquid crystal panels 341 as optical modulation devices, three incidence side polarizing plates 342, three emission side polarizing plates 343, and a cross dichroic prism 344 as a color synthesis optical device, the projection lens 35 as a projection optical device, a light control device 5, a shutter device 10, and an optical part housing 36 inside which are housed these members 31A, 31B, 32 to 34, 5, and 10, Herein, as shown in FIG. 1, the pair of light source devices 31A and 31B have the same configuration, and each of them includes a light source lamp 311 and a reflector 312. Then, the pair of light source devices 31A and 31B are disposed facing each other across the reflecting mirror 31C in such a way as to emit a luminous flux toward the reflecting mirror 31C.

Then, in the optical unit 3, according to the heretofore described configuration, the luminous flux emitted from the pair of light source devices 31A and 31B is reflected by the reflecting mirror 31C to the front side along an illumination optical axis Ax (FIG. 1) set inside the optical part housing 36, and made incident on the illumination optical device 32. The luminous flux made incident on the illumination optical device 32, as well as having an in-plane illuminance homogenized by the illumination optical device 32, is separated into three color lights R, G, and B by the color separation optical device 33. The separated color lights are modulated one by each liquid crystal panel 341 in accordance with the image information, forming an image for each color light. The images, one for each color light, are synthesized by the prism 344, and projected onto the screen (not shown) by the projection lens 35.

As the heretofore described members 31A to 31C and 32 to 35 are utilized as optical systems of each of various general projectors, a specific description will be omitted, and only the light control device 5 and shutter device 10 will be described hereafter.

Configuration of Light control Device

Figure 2A:
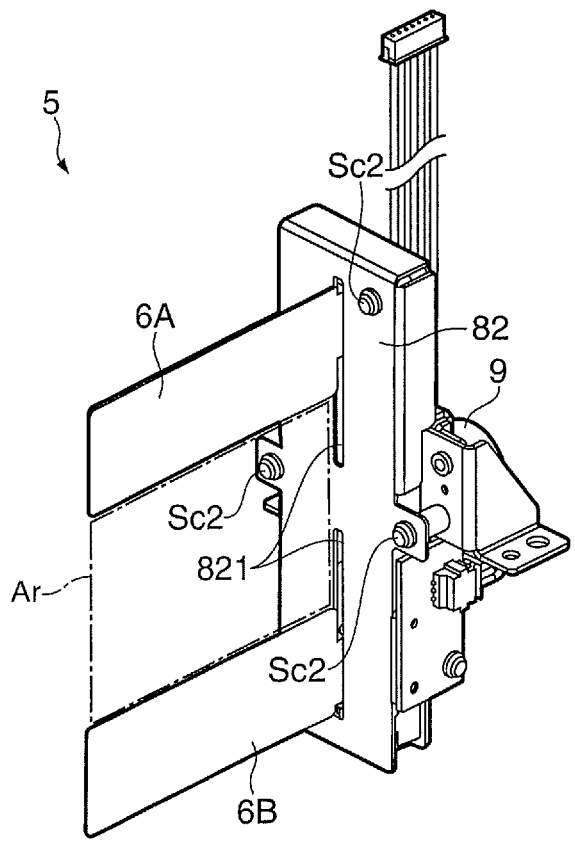
FIGS. 2A and 2B show a configuration of a light control device in the embodiment.
Figure 2B:
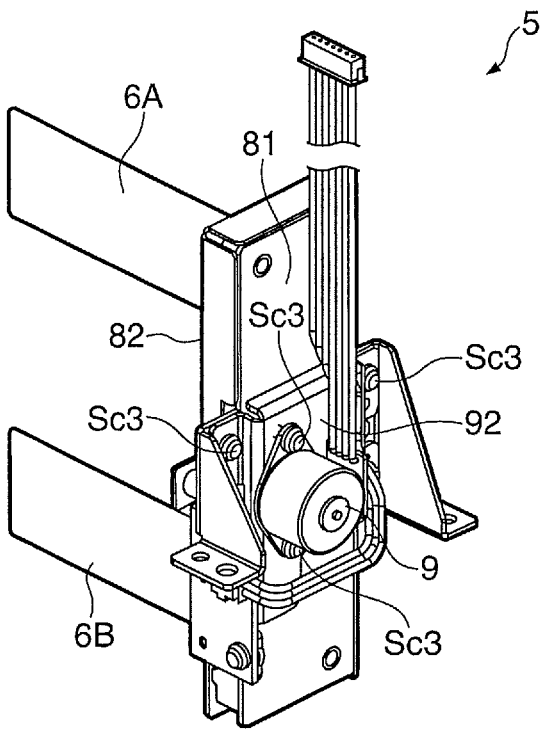
Figure 3:
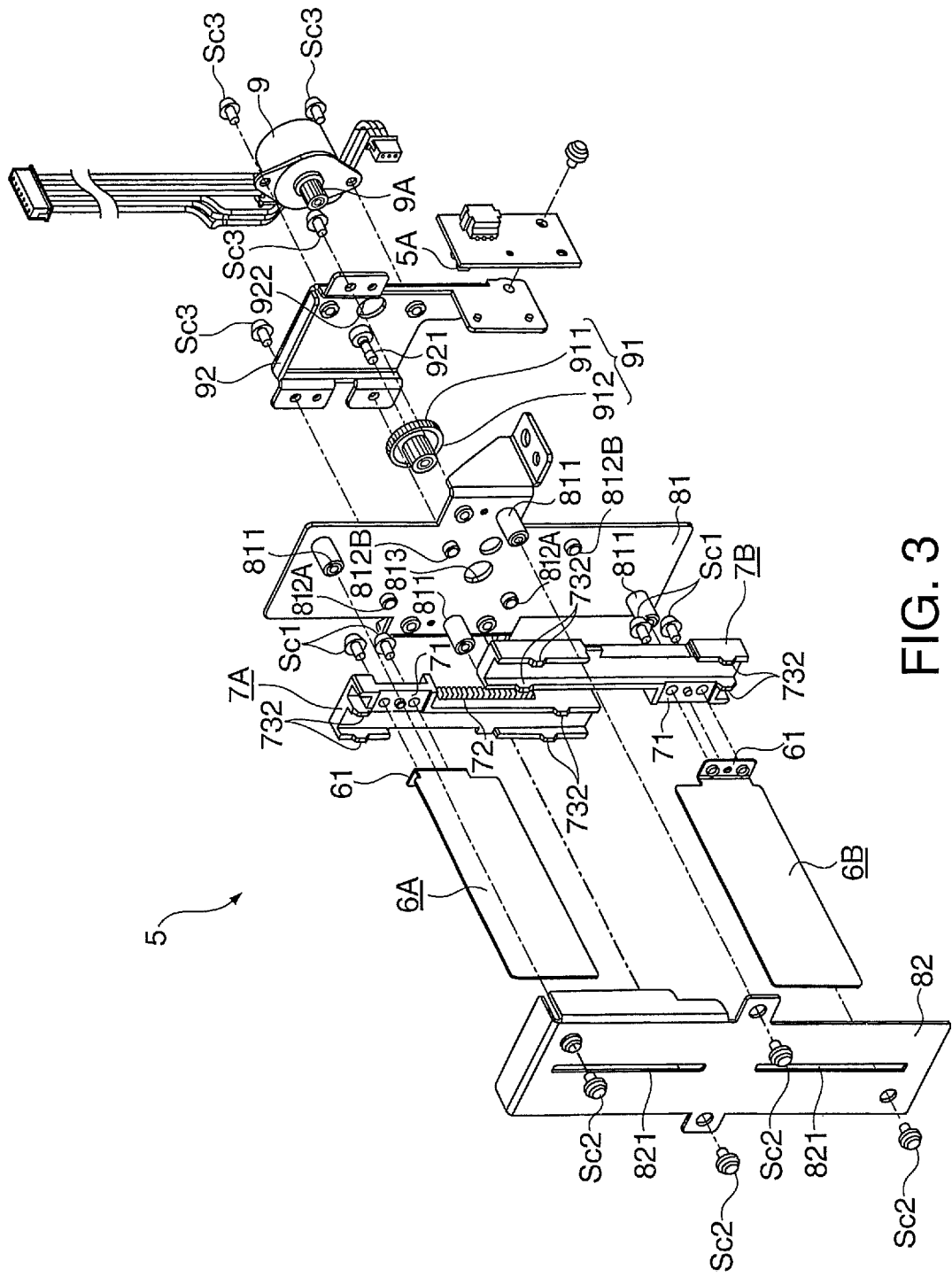
FIG. 3 shows a configuration of the light control device in the embodiment.

FIGS. 2A, 2B, and 3 show a configuration of the light control device 5. Specifically, FIG. 2A is a perspective view of the light incidence side of the light control device 5 seen from the left side, while FIG. 2B is a perspective view of the light incidence side of the light control device 5 seen from the right side. FIG. 3 is an exploded perspective view of the light control device 5.

The light control device 5, being disposed between the reflecting mirror 31C and first lens array 321, as shown in FIG. 1, under the control by the control device 4, changes the area of a light passage Ar (FIG. 2A) through which the luminous flux passes, controlling the quantity of luminous flux heading toward the first lens array 321.

As shown in FIGS. 2A, 2B, and 3, the light control device 5 includes a pair of light shielding blades 6A and 6B, a pair of moving members 7A and 7B (FIG. 3), a pair of clamping members 81 and 82, a light control motor 9, and the like.

As shown in FIG. 3, the pair of light shielding blades 6A and 6B, having the same configuration, are disposed so as to have a 180 degree rotational symmetry around the axis of rotation of a rotating gear 91 meshing with a motor shaft 9A of the light control motor 9.

The light shielding blades 6A and 6B, being configured of a material such as a metal with a high heat resistance, are formed in a rectangular plate-like shape, perpendicular to the illumination optical axis Ax, extending in a left-right direction.

As shown in FIG. 3, blade side connection portions which, being bent approximately 90 degrees, are for connecting the light shielding blades 6A and 6B to the moving members 7A and 7B respectively are provided one at each of the right side ends of the light shielding blades 6A and 6B.

Hereafter, for convenience of description, the light shielding blade 6A disposed on the upper side will be described as the upper side light shielding blade 6A, while the light shielding blade 6B disposed on the lower side will be described as the lower side light shielding blade 6B.

Figure 4A:
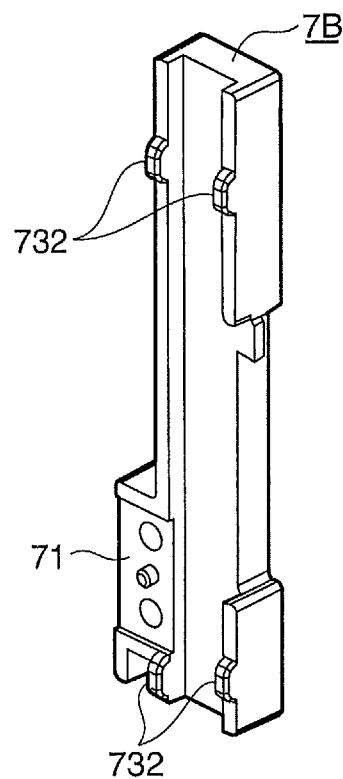
FIGS. 4A and 4B are perspective views showing a configuration of a moving member in the embodiment.
Figure 4B:
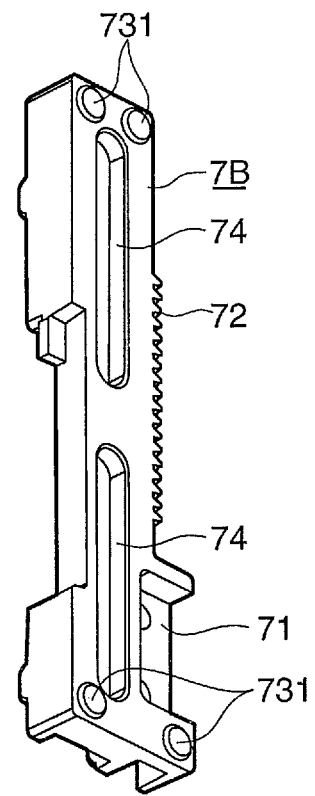

FIGS. 4A and 4B are perspective views showing a configuration of the moving member 7B. Specifically, FIG. 4A is a perspective view of the moving member 7B seen from the left side, while FIG. 4B is a perspective view of the moving member 7B seen from the right side, As shown in FIG. 3, in the same way as the pair of light shielding blades 6A and 6B, the pair of moving members 7A and 7B, having the same configuration, are disposed so as to have a 180 degree rotational symmetry around the axis of rotation of the rotating gear 91.

That is, in a condition in which the light control device 5 is assembled, the pair of moving members 7A and 7B are disposed side by side in a direction parallel to the illumination optical axis Ax. Specifically, the moving member 7B (hereafter, the lower side moving member 7B) connected to the lower side light shielding blade 6B is disposed on an optical path's upstream side (a side close to the reflecting mirror 31C) of the moving member 7A (hereafter, the upper side moving member 7A) connected to the upper side light shielding blade 6A.

In the embodiment, the pair of moving members 7A and 7B are configured of a synthetic resin molding.

Hereafter, a description will be given, based on FIGS. 4A and 4B, of the lower side moving member 7B.

The lower side moving member 7B is configured of a columnar member extending in an up-down direction, as shown in FIGS. 4A and 4B.

A moving side connection portion 71 which, protruding to an optical path's downstream side (the first lens array 321 side), is connected to the blade side connection portion 61 by screws Sc1 (FIG. 3) is provided on the lower side of the lower side moving member 7B.

Also, a rack 72 is formed in the up-down direction, as shown in FIG. 4B, at an edge of the lower side moving member 7B opposed to the upper side moving member 7A.

Furthermore, as shown in FIGS. 4A and 4B, four abutment portions 731 and 732, two each, which make abutment with the pair of clamping members 81 and 82 respectively, are provided protruding from both left and right end faces respectively of the lower side moving member 7B.

That is, by providing the four abutment portions 731 and 732, the area of contact of the pair of moving members 7A and 7B with the pair of clamping members 81 and 82 is made small.

Also, as shown in FIG. 4B, grooves 74 extending in the up-down direction are provided in line, one above the other, in the right side end face of the lower side moving member 7B.

The pair of clamping members 81 and 82 are members which, as well as clamping the pair of moving members 7A and 7B, support the whole of the light control device 5.

Hereafter, for convenience of description, the clamping member 81 disposed on the right side will be described as the right side clamping member 81, while the clamping member 82 disposed on the left side will be described as the left side clamping member 82.

The right side clamping member 81 is configured of an approximately rectangular plate body.

As shown in FIG. 3, four connection protrusions 811 are formed one in each of positions on the left side end face of the right side clamping member 81 which avoid the pair of moving members 7A and 7B.

Also, as shown in FIG. 3, two guide protrusions 812A are formed on the left side end face of the right side clamping member 81 so as to correspond to the disposition position of the upper side moving member 7A.

The two guide protrusions 812A, being provided in line, one above the other, are portions which loosely fit into the grooves 74 of the upper side moving members 7A in the condition in which the light control device 5 is assembled.

Two guide protrusions 812B, which are the same as the guide protrusions 812A, are also formed one in each of positions on the left side end face of the right side clamping member 81 which correspond to the disposition position of the lower side moving member 7B.

Furthermore, as shown in FIG. 3, a through hole 813 through which is inserted one portion of the rotating gear 91 is formed in an approximately central portion of the right side clamping member 81.

In the same way as the right side clamping member 81, as shown in FIG. 3, the left side clamping member 82 is configured of an approximately rectangular plate body.

As shown in FIG. 3, a pair of slits 821 extending in the up-down direction are provided in line in the left side clamping member 82 so as to correspond to the disposition positions of the pair of light shielding blades 6A and 6B.

The pair of slits 821, having the same length dimension, are formed in such a way as to be greater than the up-down direction length dimension of the light shielding blades 6A and 6B.

According to the above configuration, as shown in FIG. 2A, by meshing screws Sc2 (FIGS. 2A and 3) with the connection protrusions 811 in a condition in which the pair of light shielding blades 6A and 6B are inserted in the slits 821 of the left side clamping member 82, the pair of clamping members 81 and 82 are integrated in a condition in which the moving members 7A and 7B are clamped from both left and right sides by the clamping members 81 and 82.

The light control motor 9, being configured of a general motor, is driven under the control by the control unit 4.

As shown in FIGS. 2A and 2B, or FIG. 3, the light control motor 9 is fixed to the right side end face of the right side clamping member 81 by screws Sc3 (FIGS. 2B and 3), via a motor support plate 92, in such a way that the motor shaft 9A (FIG. 3) faces the left side.

As shown in FIG. 3, a pivotal protrusion 921 which pivots the rotating gear 91 in such a way that the rotating gear 91 can rotate is formed in a position on the left side end face of the motor support plate 92 which is opposed to the through hole 813 of the right side clamping member 81.

Herein, as shown in FIG. 3, the rotating gear 91 is one in which a large diameter first gear 911 positioned on the right side and a small diameter second gear 912 positioned on the left side are integrally formed.

Then, the rotating gear 91 is configured so that, in the condition in which the light control device 5 is assembled, the second gear 912, as well as being inserted into the through hole 813 of the right side clamping member 81, comes into a space between the pair of moving members 7A and 7B, and meshes with the racks 72 of the moving members 7A and 7B.

Also, as shown in FIG. 3, a through hole 922 through which the motor shaft 9A of the light control motor 9 is inserted is formed in a position in the motor support plate 92 close to the pivotal protrusion 921.

Then, in the condition in which the light control device 5 is assembled, the motor shaft 9A meshes with the first gear 911 of the rotating gear 91

That is, by the light control motor 9 being driven, the rotation of the motor shaft 9A is transmitted to the pair of moving members 7A and 7B via the rotating gear 91, and the pair of moving members 7A and 7B, by being guided by the guide protrusions 812A and 812B respectively, move in the up-down direction.

Then, the pair of light shielding blades 6A and 6B, by moving in the up-down direction together with the pair of moving members 7A and 7B, move close to and away from each other.

That is, the area of the light passage Ar (FIG. 2A) between the pair of light shielding blades 6A and 6B is changed by the movement of the pair of light shielding blades 6A and 6B, controlling the quantity of luminous flux heading toward the first lens array 321.

Configuration of Shutter Device

Figure 5:
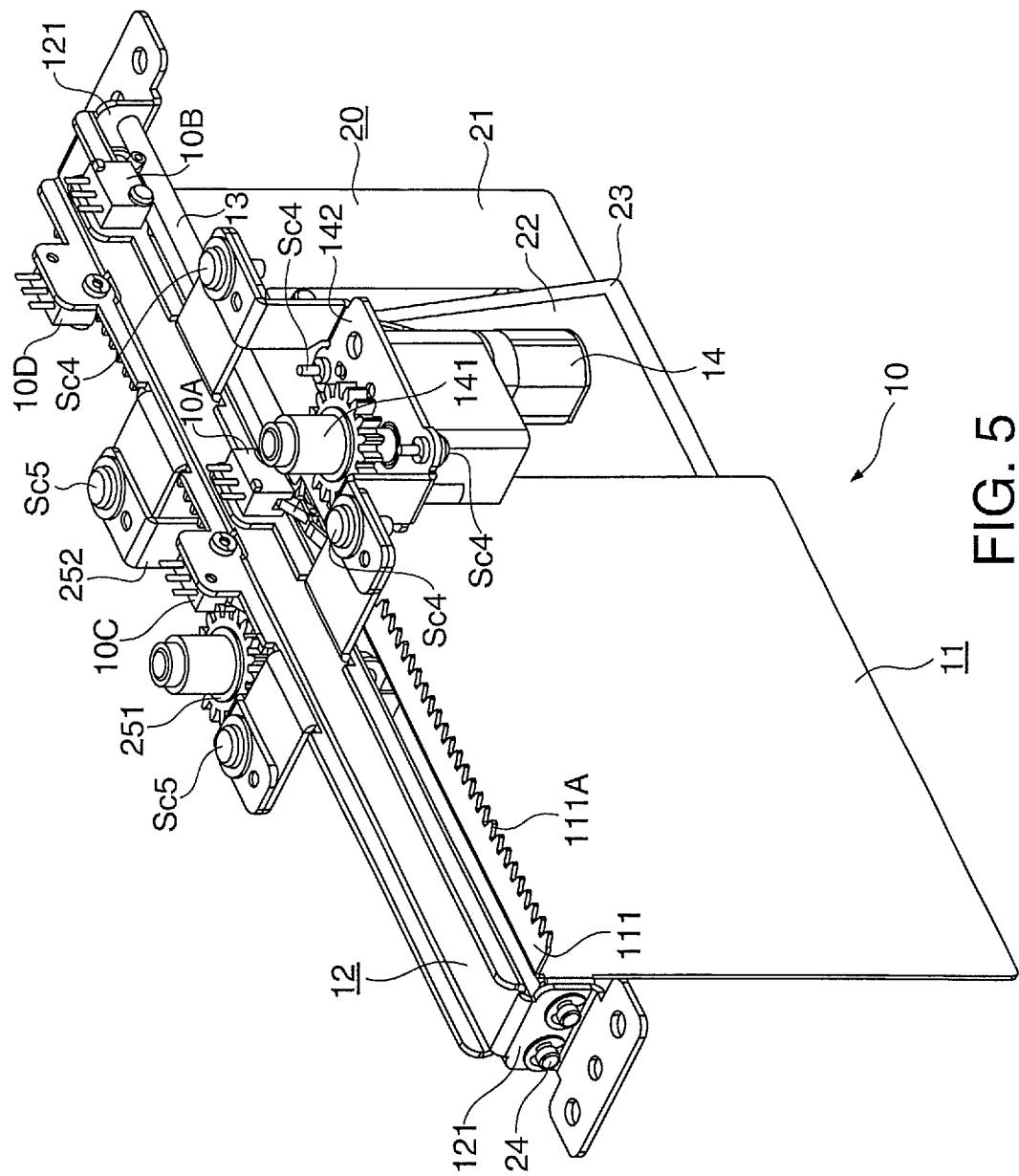
FIG. 5 shows a configuration of a shutter device in the embodiment.
Figure 6:
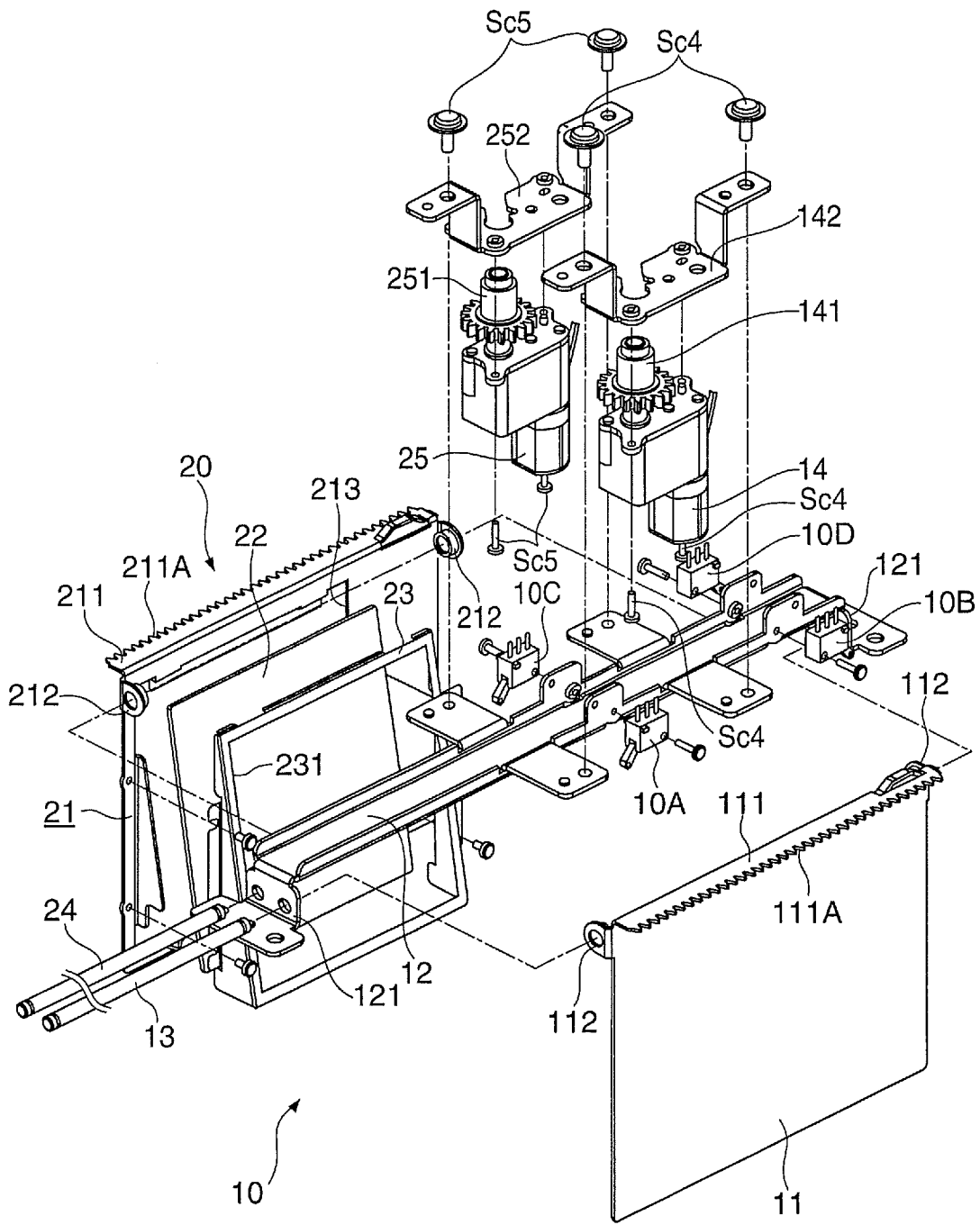
FIG. 6 shows a configuration of the shutter device in the embodiment.

FIGS. 5 and 6 show a configuration of the shutter device 10. Specifically, FIG. 5 is a perspective view of the light incidence side of the shutter device 10 seen from the left side. FIG. 6 is an exploded perspective view of the shutter device 10.

The shutter device 10, being disposed between the lens arrays 321 and 322, as shown in FIG. 1, under the control by the control unit 4, shields the luminous flux falling incident via the first lens array 321, setting a projection image to nondisplay (image mute).

In the embodiment, the shutter device 10 is also provided with a filter device 20, as shown in FIG. 1, 5, or 6.

As shown in FIG. 5 or 6, the shutter device 10 includes a light shielding plate 11, a support member 12, a first support rail 13, a first drive motor 14, and the like.

The light shielding plate 11, being configured of a member such as a metal with a high heat resistance, is configured of a rectangular plate body extending perpendicular to the illumination optical axis Ax.

As shown in FIG. 5 or 6, a bent portion 111 bent approximately 90 degrees to the optical path's upstream side (first lens array 321 side) is formed at the upper side edge of the light shielding plate 11.

Then, a rack 111A is formed in the left-right direction in the leading end portion of the bent portion 111.

Also, as shown in FIG. 6, a pair of through portions 112, bent approximately 90 degrees toward the optical path's downstream side (second lens array 322 side), through which the first support rail 13 is inserted, are formed one on each of the upper sides of both left and right ends of the light shielding plate 11.

The support member 12, being configured of a rectangular plate body extending in a front-back direction, is suspended in the left-right direction on the upper side of the optical part housing 36, supporting the whole of the shutter device 10 and filter device 20.

As shown in FIG. 5 or 6, a pair of rail supports 121 which, being bent approximately 90 degrees to the lower side, support the first support rail 13 are formed one at each of both left and right ends of the support member 12.

The first support rail 13 having a columnar shape extending in the left-right direction, both ends thereof are supported by the pair of rail supports 121 in a condition in which they are inserted through the pair of through portions 112 of the light shielding plate 11.

The first drive motor 14, being configured of a general motor, is driven under the control by the control unit 4.

As shown in FIG. 5 or 6, a rotating gear 141 rotating in conjunction with the rotation of a motor shaft (not shown) is mounted on the first drive motor 14.

Also, as shown in FIG. 5 or 6, the first drive motor 14 is fixed to the optical path's upstream side (first lens array 321 side) end of the support member 12 by a screw Sc4, via a first motor support plate 142, in such a way that the rotating gear 141 is positioned on the upper side.

Then, the rotating gear 141 of the first drive motor 14 meshes with the rack 111A of the light shielding plate 11 in a condition in which the shutter device 10 is assembled.

That is, by the first drive motor 14 being driven, the rotation of the rotating gear 141 is transmitted to the light shielding plate 11, and the light shielding plate 11, by being guided by the first support rail 13, moves in the left-right direction.

Then, by the light shielding plate 11 moving to the left side (the condition of FIG. 5), the luminous flux passing through the first lens array 321 is shielded by the light shielding plate 11, setting the image mute.

Also, by the light shielding plate 11 moving to the right side, the optical path of the luminous flux passing through the first lens array 321 is opened, setting a normal condition.

Configuration of Filter Device

The filter device 20, being disposed on the optical path's downstream side (second lens array 322 side) of the light shielding plate 11, changes a color purity and contrast of the projection image under the control by the control unit 4.

As shown in FIG. 5 or 6, the filter device 20 includes a moving plate 21, an optical filter 22, a mounting member 23, a second support rail 24, a second drive motor 25 (FIG. 6), and the like.

As shown in FIG. 6, the moving plate 21, having approximately the same shape as the light shielding plate 11, includes a bent portion 211 (a rack 211A) and a pair of through portions 212 which are the same as the bent portion 111 (rack 111A) and pair of through portions 112.

Also, as shown in FIG. 6, a rectangular opening 213 enabling approximately the whole of the luminous flux passing through the first lens array 321 to pass through is formed in the moving plate 21.

The optical filter 22 is a filter which, having a rectangular shape, as shown in FIG. 6, filters out a predetermined spectral component of the incident luminous flux.

The mounting member 23, being configured of a frame body having an opening 231 corresponding to the opening 213 of the moving plate 21, as shown in FIG. 6, is a member for mounting the optical filter 22 on the moving plate 21 while supporting the optical filter 22.

Then, the optical filter 22 is mounted on the moving member 21 with the mounting member 23 in a condition in which it is tilted with respect to the illumination optical axis Ax, although a specific illustration is omitted.

More specifically, the optical filter 22 is mounted on the moving plate 21 in a tilted condition such that the upper side end is positioned on the optical path's downstream side (second lens array 322 side), and the lower side end is positioned on the optical path's upstream side (first lens array 321 side).

The second support rail 24 having the same shape as the first support rail 13, both ends thereof are supported on the pair of rail supports 121 in a condition in which they are inserted through the pair of through portions 212 of the moving plate 21.

The second drive motor 25, having the same configuration as the first drive motor 14, includes a rotating gear 251 the same as the rotating gear 141.

Then, as shown in FIG. 5 or 6, the second drive motor 25 is fixed to the optical path's downstream side (second lens array 322 side) end of the support member 12 by screws Sc5, via the second motor support plate 252, in such a way that the rotating gear 251 is positioned on the upper side.

Then, in a condition in which the filter device 20 is assembled, the rotating gear 251 of the second drive motor 25 meshes with the rack 211A of the moving plate 21.

That is, by the second drive motor 25 being driven, the moving plate 21 moves in the same way as the light shielding plate 11.

Then, by the moving plate 21 moving to the left side, the predetermined spectral component of the luminous flux passing through the first lens array 321 is filtered out by the optical filter 22, changing the color purity and contrast of the projection image.

Also, by the moving plate 21 moving to the right side, the optical filter 22 is positioned outside the luminous flux passing through the first lens array 321, setting the normal condition.

Configuration of Control Unit

Figure 7:
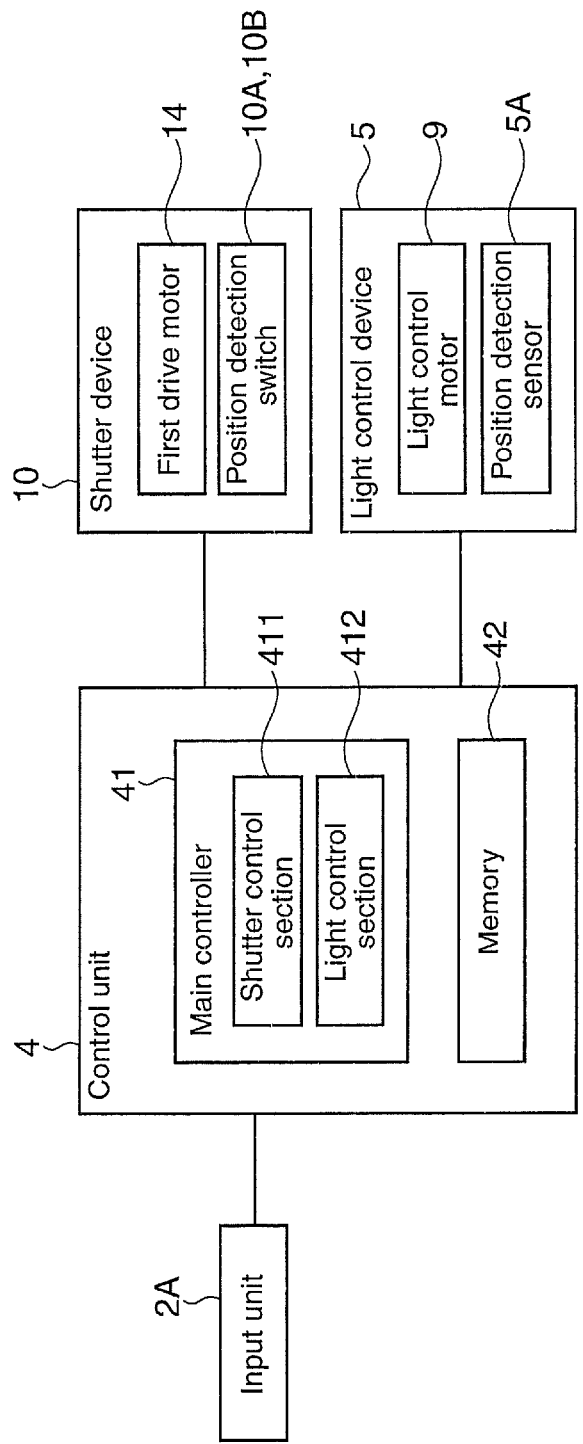
FIG. 7 is a block diagram showing a structure of control by a control unit in the embodiment.

FIG. 7 is a block diagram showing a structure of control by the control unit 4.

Figure 8:
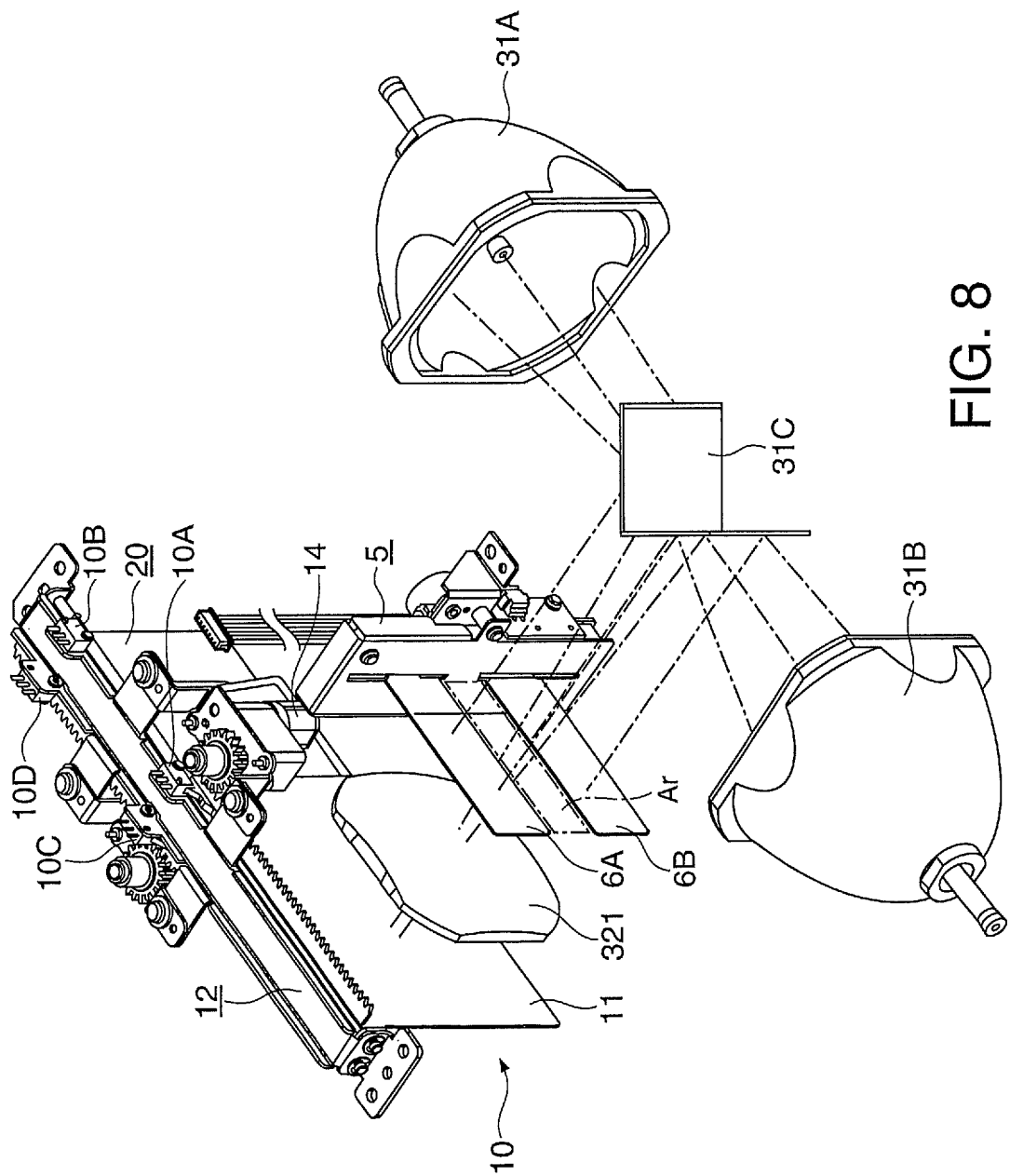
FIG. 8 shows a condition in which image mute is set in the embodiment.

FIG. 8 shows a condition in which the image mute is set.

The control unit 4, including a main controller 41 such as a central processing unit (CPU), as shown in FIG. 7, controls the whole of the projector 1 in accordance with a control program stored in a memory 42. Hereafter, in order to simplify the description, with regard to the control unit 4, only a function of controlling operations of the light control device 5 and shutter device 10 will be described, and a description of other functions will be omitted.

As shown in FIG. 7, the main controller 41 includes a shutter control section 411 and a light control section 412.

The shutter control section 411 controls the operation of the shutter device 10 (first drive motor 14) while confirming signals from position detection switches 10A and 10B (FIGS. 5 to 8) which, being mounted on the optical path's upstream side (first lens array 321 side) of the support member 12, detect a position of the light shielding plate 11 in accordance with an operation signal from an input unit 2A (FIG. 7) such as a remote controller or an operating panel provided on the exterior housing 2.

That is, when an input operation for setting the image mute is implemented by a user operating the input unit 2A, as shown in FIG. 8, the shutter control section 411 moves the light shielding plate 11 to a position in which it shields the luminous flux passing through the first lens array 321.

The light control section 412 analyses, for example, the image information (an image signal), and controls the operation of the light control device 5 (light control motor 9) in accordance with the luminance of the images formed on the liquid crystal panels 341 while confirming a signal from a position detection sensor 5A (FIGS. 3 and 7) which, being mounted on the motor support plate 92, detects positions of the pair of light shielding blades 6A and 6B (a rotational position of the motor shaft 9A or rotating gear 91).

That is, when the images formed on the liquid crystal panels 341 are dark as a whole, the light control section 412 moves the pair of light shielding blades 6A and 6B in a direction in which they move close to each other, reducing the quantity of luminous flux.

Meanwhile, when the images formed on the liquid crystal panels 341 are bright as a whole, the light control section 412 moves the pair of light shielding blades 6A and 6B in a direction in which they move away from each other, increasing the quantity of luminous flux.

A high contrast ratio projection image is realized by the above control.

Also, the light control section 412 controls the operation of the light control device 5 (light control motor 9) in accordance with an operation signal from the input unit 2A.

That is, when the input operation for setting the image mute is implemented by the user operating the input unit 2A, the light control section 412 retrieves position-related positional information stored in the memory 42, and moves the pair of light shielding blades 6A and 6B to predetermined positions based on the positional information (positions in which they shield one portion of the luminous flux from the reflecting mirror 31C heading toward the first lens array 321), as shown in FIG. 8.

The predetermined positions are positions measured, before the projector 1 is manufactured, in such a way that the temperature of the light shielding plate 11 will not exceed a predetermined threshold value in the condition in which the image mute is set (in the condition in which the luminous flux is shielded by the light shielding plate 11).

With regard to the structure of control of an operation of the filter device 20 (second drive motor 25), a description is omitted, but it is possible, in the same way as in the heretofore described shutter control section 411, to employ a structure of controlling an operation of the second drive motor 25 in accordance with an operation of the input unit 2A by the user while confirming signals from position detection switches 10C and 10D (FIGS. 5, 6, and 8) which, being mounted on the optical path's downstream side (second lens array 322 side) of the support member 12, detect a position of the moving plate 21.

According to the heretofore described embodiment, there are the following advantages.

In the embodiment, the projector 1 includes, apart from the shutter device 10 having the light shielding plate 11, the light control device 5 disposed on the optical path's upstream side of the shutter device 10. By this means, when the image mute is set by the light shielding plate 11 being moved into the optical path, one portion of the luminous flux emitted from the light source devices 31A and 31B can be shielded by the light control device 5 (pair of light shielding blades 6A and 6B) too. That is, at a time of image mute, the luminous flux emitted from the light source devices 31A and 31B is shielded by one portion of the luminous flux being made incident on the pair of light shielding blades 6A and 6B, and furthermore, the remaining luminous flux being made incident on the light shielding plate 11.

Consequently, as the quantity of the luminous flux made incident on the light shielding plate 11 is, at the time of image mute, reduced by the quantity of the luminous flux shielded by the pair of light shielding blades 6A and 6B, it is possible to suppress a rise in temperature of the light shielding plate 11, and it is possible to prevent a thermal deterioration of the light shielding plate 11. Also, as it is possible to suppress the rise in temperature of the light shielding plate 11, it also being possible to suppress a rise in temperature of the first drive motor 14 which causes the light shielding pate 11 to operate, it is possible to avoid a defective operation of the shutter device 10.

Also, as the shutter device 10 and light control device 5 shield the luminous flux passing through the first lens array 321 at the time of image mute, it does not happen that the luminous flux is made incident on optical elements, such as the polarization conversion element 323, incidence side polarizing plates 342, liquid crystal panels 341, and emission side polarizing plates 343, disposed on the optical path's downstream side of the shutter device 10. That is, it is also possible to prevent the optical elements 323 and 341 to 343 from thermally deteriorating due to unnecessary luminous flux being made incident on the optical elements 323 and 341 to 343.

As it is possible, according to the above, to prevent the thermal deterioration of the light shielding plate 11 and optical elements 323 and 341 to 343, it is possible to achieve an increase in lifespan of the projector 1.

Also, as the projector 1 includes the control unit 4, it is possible, at the time of image mute, to automatically move the pair of light shielding blades 6A and 6B to positions in which they shield one portion of the luminous flux emitted from the light source devices 31A and 31B. Because of this, it is possible to reliably reduce the quantity of the luminous flux made incident on the light shielding plate 11 at the time of image mute.

Furthermore, by employing the heretofore described control by the control unit 4 of the operation of the light control device 5, it is possible to move the pair of light shielding blades 6A and 6B to appropriate positions at the time of image mute, and it is also possible to prevent the pair of light shielding blades 6A and 6B from being raised to an excessively high temperature. That is, it is possible to suppress the rise in temperature of the pair of light shielding blades 6A and 6B, and light shielding plate 11, in a balanced manner.

Also, the light control device 5, including the pair of plate-like light shielding blades 6A and 6B extending perpendicular to the illumination optical axis Ax, changes the area of the light passage Ar by moving the pair of light shielding blades 6A and 6B parallel to their plate surfaces. By this means, as it is possible to configure the pair of light shielding blades 6A and 6B of a simple plate body, it is possible to manufacture the pair of light shielding blades 6A and 6B easily.

Furthermore, the light control device 5 includes the pair of moving members 7A and 7b, apart from the pair of light shielding blades 6A and 6B. By this means, in the event that the rotating gear 91 rotating in conjunction with the drive of the light control motor 9 is disposed between the pair of moving members 7A and 7B, and meshed with the rack 72 of each moving member 7A and 7B, by driving the light control motor 9, the rotation of the rotating gear 91 is transmitted to the pair of moving members 7A and 7B, enabling the pair of light shielding blades 6A and 6B to move close to and away from each other (enabling area of the light passage Ar to be changed). Because of this, it is possible to simplify the structure of the light control device 5.

Also, the pair of moving members 7A and 7B are configured of a columnar member extending in the up-down direction. By this means, it is possible to make a moving structure, such as the pair of moving members 7A and 7B, and rotating gear 91, which moves the pair of light shielding blades 6A and 6B, a simple and small structure without separating it from the optical axis, and increasing its size to the right side.

Furthermore, the pair of light shielding blades 6A and 6B, and pair of moving members 7A and 7B, are configured of separate members. Then, the light shielding blades 6A and 6B are formed of a metal material, while the moving members 7A and 7B are formed of a resin material. Because of this, it is possible, when the light control device 5 operates, to reduce a friction sound due to the meshing of the rotating gear 91 with the racks 72, and a friction sound due to a sliding contact of the pair of clamping members 81 and 82 with the pair of moving members 7A and 7B. Consequently, it is possible to secure a silence of the projector 1.

Also, as the pair of moving members 7A and 7B have the same shape, it being possible to manufacture the pair of moving members 7A and 7B using the same manufacturing method, it is possible to manufacture the pair of moving members 7A and 7B easily. The same applies to the pair of light shielding blades 6A and 6B.

Furthermore, the shutter device 10 and filter device 20, employing the common support member 12, are integrated. By this means, it being possible to reduce the number of members even in the event of employing a configuration using both the shutter device 10 and filter device 20, it is possible to avoid an increase in size of the optical unit 3.

The invention not being limited to the previously described embodiment, modifications, improvements, and the like, within a scope in which it is possible to achieve an advantage of some aspects of the invention are incorporated in the invention.

In the previously described embodiment, the light control device 5 not being limited to the configuration described in the previously described embodiment, it is also acceptable to employ other configurations.

For example, the number of light shielding blades 6A and 6B not being limited to two, it is also acceptable that it is one, or three or more.

Also, for example, it is also acceptable that the light control device 5 is rotated 90 degrees around the illumination optical axis Ax, and the direction of movement of the pair of light shielding blades 6A and 6B is set to the left-right direction, rather than the up-down direction.

Furthermore, for example, it is also acceptable to employ a configuration wherein the area of the light passage Ar is changed by pivoting the pair of light shielding blades 6A and 6B, rather than a configuration wherein it is changed by moving them linearly.

In the previously described embodiment, the pair of light shielding blades 6A and 6B, and pair of moving members 7A and 7B, are configured of separate members but, not being limited to this, it is also acceptable that the light shielding blades and moving members are integrally formed of a material such as a metal with a high heat resistance.

In the previously described embodiment, at the time of image mute, the control unit 4 moves the pair of light shielding blades 6A and 6B to positions set in advance but, not being limited to this, it is also acceptable to employ the following configuration.

For example, a temperature sensor which detects the temperature of the light shielding plate 11 is provided.

Then, at the time of image mute, the control unit 4, while confirming the temperature detected by the temperature sensor, moves the pair of light shielding blades 6A and 6B in the direction in which they move close to each other when the temperature of the light shielding plate 11 is higher than a predetermined threshold value, and moves the pair of light shielding blades 6A and 6B in the direction in which they move away from each other when the temperature of the light shielding plate 11 is lower than the predetermined threshold value.

Also, it is also acceptable to provide a temperature sensor around the pair of light shielding blades 6A and 6B, measure the temperature of the light shielding blades 6A and 6B, and move the pair of light shielding blades 6A and 6B in accordance with the temperature of the pair of light shielding blades 6A and 6B.

In the previously described embodiment, the shutter device 10 is configured in such a way that the light shielding plate 11 moves by means of the drive of the first drive motor 14 but, not being limited to this, it is also acceptable to omit the first drive motor 14, and configure the shutter device 10 in such a way that the light shielding plate 11 is manually moved.

When the shutter device 10 is configured in this way, the control unit 4, after confirming, based on signals from the position detection switches 10A and 10B, that the light shielding plate 11 has been positioned inside the optical path (in the position in which it shields the luminous flux from the first lens array 321), moves the pair of light shielding blades 6A and 6B to the predetermined positions.

In the previously described embodiment, the number of light source devices not being limited to two, it is also acceptable that it is one, or three or more.

In the previously described embodiment, the projector 1 is configured including the three liquid crystal panels 341, but the invention is not limited to this. That is, the invention can also be applied to a projector using two or less, or four or more, liquid crystal panels.

In the previously described embodiment, as the optical modulation device, it is also acceptable to employ a reflective liquid crystal panel, apart from a transmissive liquid crystal panel. Also, it is also acceptable to employ an optical modulation device of another configuration, provided that it is an optical modulation device which modulates a luminous flux in accordance with image information, forming an image. The invention can also be applied to a projector using an optical modulation device other than liquid crystal, for example, a device using a micromirror. In the event of using this kind of optical modulation device, it is possible to omit the luminous flux incidence side and luminous flux emission side polarizing plates 342 and 343.

In the previously described embodiment, only an example of a front projection type projector has been given, but the invention can also be applied to a rear type projector which, including a screen, carries out a projection from the rear surface side of the screen.

The projector of some aspects of the invention, as it is possible therewith to prevent the thermal deterioration of the light shielding plate used at the time of image mute, can be utilized as a projector used in a presentation and as a home theater.

The present application claims priority from Japanese Patent Application No. 2009-058087 filed on Mar. 11, 2009, which is hereby incorporated by reference in its entirety.

What is claimed:
1. A projector comprising:
a light source device;
an optical modulation device configured to modulate light emitted from the light source device in accordance with image information;
a projection optical device configured to project the light modulated by the optical modulation device;
a light shielding element which can move into and out of an optical path of the light from the light source, and shields the light by moving into the optical path;
a light control device that is disposed between the light source and the light shielding element, and controls the quantity of the light entering the optical modulation device; and
a control unit that controls the light shielding element and light control device,
wherein
the control unit controls the light control device to shield some but not all of the quantity of the light when the light shielding element is entirely shielding the light.
2. The projector according to claim 1, wherein
the light control device includes a plurality of light shielding blades that are formed in a plate-like shape extending perpendicular to the optical axis of the luminous flux, and move parallel to their plate surfaces, changing the area of the light passage.
3. The projector according to claim 2, wherein the light control device further includes:
two of the light shielding blades opposed to each other across the optical axis;
two moving members, each connected to a respective one of the light shielding blades, and disposed side by side in a direction parallel to the optical axis, move together with the two light shielding blades; and
at least one rack that is formed in a direction of movement, the at least one rack being at each of the mutually opposed edges of the pair of moving members.
4. The projector according to claim 3, wherein
the light shielding blades and the moving members are configured of separate members.

* * * * *